(12) United States Patent
Sandhu et al.

(10) Patent No.: US 6,783,114 B2
(45) Date of Patent: Aug. 31, 2004

(54) CABLE ASSEMBLY AND AIR OUTFLOW VALVE INCORPORATING THE SAME

(75) Inventors: Sewa S. Sandhu, Tucson, AZ (US); Kenyon Kehl, Oro Valley, AZ (US)

(73) Assignee: Honeywell International, Inc., Morristown, NJ (US)

(*) Notice: Subject to any disclaimer, the term of this patent is extended or adjusted under 35 U.S.C. 154(b) by 110 days.

(21) Appl. No.: 10/014,135

(22) Filed: Dec. 11, 2001

(65) Prior Publication Data

US 2003/0107019 A1 Jun. 12, 2003

(51) Int. Cl.$^7$ .............................................. F16K 31/44
(52) U.S. Cl. ........................ 251/294; 251/58; 454/73
(58) Field of Search ................... 251/294, 58; 454/71, 454/72, 73, 74; 74/89.2, 89.22, 500.5, 502.3, 502.4, 502.5, 502.6

(56) References Cited

U.S. PATENT DOCUMENTS

| | | | |
|---|---|---|---|
| 2,815,705 A | * 12/1957 | Jensen | 454/72 |
| 2,830,521 A | * 4/1958 | Fischer et al. | 454/73 |
| 3,447,777 A | * 6/1969 | Carlson | 251/294 X |
| 3,537,510 A | * 11/1970 | Rannenberg et al. | 454/71 X |
| 3,974,752 A | 8/1976 | Burgess et al. | |
| 4,195,798 A | * 4/1980 | Costantino et al. | 74/502.4 X |
| 4,416,647 A | * 11/1983 | White, Jr. | 474/134 |
| 4,428,194 A | 1/1984 | Stokes et al. | |
| 4,445,532 A | 5/1984 | Mitchell | |
| 4,458,718 A | 7/1984 | Vick | |
| 4,506,594 A | * 3/1985 | Rowland et al. | 454/74 |
| 4,523,609 A | 6/1985 | Weck | |
| 4,553,474 A | 11/1985 | Wong et al. | |
| 4,768,555 A | 9/1988 | Abel | |
| 4,773,307 A | * 9/1988 | Goodman | 454/73 |
| 4,790,206 A | * 12/1988 | Thomas | 74/502.4 |
| 4,964,422 A | 10/1990 | Ball et al. | |
| 4,964,431 A | 10/1990 | Ball et al. | |
| 4,967,778 A | 11/1990 | Ball et al. | |
| 5,000,213 A | 3/1991 | Tervo et al. | |
| 5,005,804 A | 4/1991 | Andersen et al. | |
| 5,029,599 A | 7/1991 | Ball | |
| 5,067,506 A | 11/1991 | Ball et al. | |
| 5,102,097 A | 4/1992 | Davis et al. | |
| 5,113,910 A | 5/1992 | Ball | |
| 5,238,220 A | 8/1993 | Shell et al. | |
| 5,307,837 A | * 5/1994 | Woltz et al. | 251/294 X |
| 5,334,090 A | 8/1994 | Rix | |
| 5,351,934 A | 10/1994 | Jensen et al. | |
| 5,386,848 A | 2/1995 | Gilchrist et al. | |
| 5,462,254 A | * 10/1995 | Muller | 251/294 X |
| 5,590,852 A | 1/1997 | Olson | |
| 5,702,433 A | * 12/1997 | Taylor et al. | 607/101 |
| 5,899,064 A | 5/1999 | Cheung | |
| 5,927,335 A | 7/1999 | Christensen | |
| 5,967,461 A | 10/1999 | Farrington | |
| 6,006,780 A | 12/1999 | Tseng et al. | |
| 6,102,609 A | * 8/2000 | Tsuge | 74/502.6 X |
| 6,116,541 A | 9/2000 | Chuang et al. | |
| 6,233,919 B1 | 5/2001 | Abel et al. | |

FOREIGN PATENT DOCUMENTS

| | | |
|---|---|---|
| GB | 1321897 | 7/1973 |
| WO | WO 02/37481 | 4/2003 |

* cited by examiner

*Primary Examiner*—David A. Scherbel
*Assistant Examiner*—Eric Keasel
(74) *Attorney, Agent, or Firm*—Douglas A. Mullen, Esq.

(57) ABSTRACT

An improved air outflow valve having a cable assembly that enhances its reliability. In a particular embodiment, the cable assembly couples the diaphragm to the control arm of the air outflow valve and includes a retainer and a cable. The retainer has a cavity to slidingly accept the end of the cable when the valve is operated in a manual mode. Thus, bending or kinking of the cable is substantially inhibited or prevented, resulting in improved valve reliability. The improved cable assembly also is available as a retrofit kit and a method of retrofitting an existing valve is also provided.

21 Claims, 8 Drawing Sheets

CABLE ASSEMBLY AND AIR OUTFLOW VALVE INCORPORATING THE SAME

BACKGROUND OF THE INVENTION

The present invention relates to an air outflow valve for use in aircraft applications and, more particularly, to an air outflow valve that incorporates a screw and cable assembly that enhances the reliability of the air outflow valve.

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, air could leak out of the aircraft. Thus, many aircraft are equipped with a cabin pressure control system to maintain and the pressure within the aircraft (so-called "cabin pressure"). Also, during flight, variations in aircraft altitude will result in changes in the ambient pressure outside of the aircraft. The cabin control pressure system controls the cabin pressure to within relatively comfortable range and makes gradual changes in the cabin pressure to minimize passenger discomfort. Cabin pressure control systems may be equipped with one or more outflow valves. An outflow valve can assist in controlling cabin pressure by regulating air flow out of the cabin.

One particular type of outflow valve used on C-130 type aircraft has a butterfly plate as the control element to regulate the flow of air out of the cabin. The butterfly plate is connected to a rotationally mounted shaft that causes movement of the butterfly plate. Two control arms are coupled to each side of the shaft. A spring is connected between each of the control arms and the body of the outflow valve and biases the butterfly plate toward the closed position. A pneumatic control diaphragm is also mounted within the outflow valve. Two cable assemblies, one for each arm assembly, mechanically couple the pneumatic control diaphragm to the control arms, via two pulley assemblies. Significantly, a retaining ball is connected to the end of each cable assembly and is inserted into a retaining hole in each arm assembly. The control diaphragm and cable assemblies are positioned and configured such that when the butterfly plate is closed, the cable assembly is under tension. Thus, movement of the pneumatic control diaphragm causes movement of the butterfly plate. While the outflow valve is believed to be generally safe and reliable, under certain circumstances certain drawbacks may exist. One drawback relates to the manual operation of the valve, described in more detail below.

The above-described outflow valve has two general modes of operation, an automatic mode and a manual mode. In the automatic mode, the position of the butterfly plate is controlled by movement of the pneumatic control diaphragm. Specifically, one side of the control diaphragm is exposed to a variable control vacuum, the magnitude of which is modulated by a control system to control the movement of the pneumatic control diaphragm. In the automatic mode, the cable assemblies remain under tension, and as the control diaphragm moves, the cable assemblies cause the control arms, and thus the butterfly plate, to move.

In the manual mode, however, an electric actuator is used instead of using the pneumatic control diaphragm to operate the butterfly plate. Therefore, in the manual mode, the control arms move while the pneumatic control diaphragm does not. This movement results in the cable assemblies no longer being under tension and instead applies a compression force to them, which may cause them to bend and/or kink and to rub against the base of the pulley bracket. This bending, kinking, and rubbing has in some cases caused premature failure of the cable assemblies. As a result, the valves may no longer operate properly in the automatic mode.

In addition to the above-noted drawbacks associated with the cable assemblies and pulley brackets, the control arms may also exhibit certain drawbacks. Specifically, the ball retaining hole in each control arm may inhibit or prevent movement of the retaining ball within retaining hole. This may lead to stress failure at the cable-retaining ball joint. Additionally, the cable assemblies may rub against a roll pin that is positioned in the tops of control arms, or against the edges of the slot that the cables pass through in reaching the ball-retaining hole. This rubbing may increase the likelihood of a stress failure.

Outflow valves of differing designs are available to replace the above-described valve, or the valve could be modified with components that implement a different type of control scheme. These, however, are relatively expensive, time consuming, and potentially complex options.

Hence, there is a need for an outflow valve that overcomes one or more of the above-noted drawbacks. Namely, an outflow valve that does not cause the cable assemblies to bend, kink, or rub when the valve is being operated manually, and/or a valve that exhibits a reduced likelihood for stress failure at the cable-retaining ball joint, and/or a valve that can be modified relatively inexpensively and/or in a relatively non-complex manner. The present invention addresses these needs.

SUMMARY OF THE INVENTION

The present invention provides an air outflow valve that is more reliable than the existing air outflow valve, and one or more components to modify existing air outflow valves of this type. The present invention reduces the likelihood that the cable assemblies will bend, kink, or rub when the valve is being operated manually, and/or the likelihood for stress failure at the cable-retaining ball joint. The present invention also provides components that will allow existing air outflow valves to be modified relatively inexpensively and in a relatively non-complex manner.

In one embodiment of the present invention, and by way of example only, an air outflow valve includes a valve body, a valve disk, at least one control arm, at least one biasing element, a control diaphragm, at least one retainer, and at least one cable. The valve disk is movably mounted within the valve body and is moveable through a plurality of positions between a closed position and an open position. Each control arm is coupled to the valve disk. Each biasing element is coupled between each control arm and the valve body for biasing the valve toward the closed position. The control diaphragm is mounted within the valve body. Each retainer is coupled to the control diaphragm and has an opening and an internal surface defining a cavity that extends from the opening a predetermined distance within the retainer. Each cable has a first end coupled to the control arm and a second end inserted through the opening and is slidably retained within the retainer cavity, the second end is moveable within the retainer cavity between the opening and a position along the predetermined distance of the cavity.

In another exemplary embodiment of the invention, a cable assembly for coupling between the diaphragm and a control arm of an air outflow valve includes a retainer and a cable. The retainer has an opening in a first end thereof and an internal surface defining a cavity that extends from the opening a predetermined distance within the retainer. The cable has a first end adapted for coupling to the control arm and a second end that is inserted through the opening and is slidably retained within the retainer cavity, the second end is moveable within the retainer cavity between the opening and a position along the predetermined distance of the cavity.

In still another exemplary embodiment of the invention, a method of modifying an air outflow valve having a valve body, a valve disk movably mounted within the valve body and moveable through a plurality of positions between a closed position and an open position, at least one control arm coupled to the valve disk, at least one biasing element coupled between each control arm and the valve body for biasing the valve disk toward the closed position, a control diaphragm mounted within the valve body, at least one cable assembly having a first end coupled to the control arm and a second end coupled to the control diaphragm, includes the steps of disassembling at least a portion of the valve body and replacing each of the cable assemblies with a replacement cable assembly. Each of the replacement cable assemblies includes a retainer and a cable. The retainer has an opening in a first end thereof and an internal surface defining a cavity that extends from the opening a predetermined distance within the retainer. The cable has a first end adapted for coupling to the control arm and a second end that is inserted through the opening and is slidably retained within the retainer cavity, the second end is moveable within the retainer cavity between the opening and a position along the predetermined distance of the cavity. The disassembled portions of the valve body are then reassembled.

In yet another exemplary embodiment of the invention, a kit for modifying an air outflow valve having a valve body, a valve disk movably mounted within the valve body and moveable through a plurality of positions between a closed position and an open position, and at least one control arm coupled to the valve disk, includes at least one cable assembly having a retainer and a cable. The retainer has an opening in a first end thereof and an internal surface defining a cavity that extends from the opening a predetermined distance within the retainer. The cable has a first end adapted for coupling to the control arm and a second end that is inserted through the opening and is slidably retained within the retainer cavity, the second end is moveable within the retainer cavity between the opening and a position along the predetermined distance of the cavity.

The present invention may also include at least one pulley assembly and at least one control arm that also reduce the likelihood of cable damage. The pulley assembly is mounted within the valve body and includes a rotationally mounted pulley positioned to contact at least a portion of the cable when the cable is in tension. The pulley assembly includes a pulley bracket, at least two support arms, a pulley, and a roll pin. The pulley bracket has a base coupled to the valve body. The support arms extend from the base at a predetermined angle relative to the base, and have a first end coupled to the base and a second end distal to the first end. The pulley is rotationally mounted between the support arms proximate the second ends, and the roll pin is mounted between the support arms proximate the first ends. The control arm includes a main body portion and at least two control arms. The control arms extend from the main body portion substantially parallel with one another and are spaced apart from one another to form a slot there between, and each arm includes an indentation collocated with the indentation in the other arm to form a retaining hole for receiving a retaining ball. The retaining hole is dimensioned so as to allow the retaining ball to move within the retaining hole.

Other independent features and advantages of the preferred outflow valve and cable assembly will become apparent from the following detailed description, taken in conjunction with the accompanying drawings which illustrate, by way of example, the principles of the invention.

DETAILED DESCRIPTION OF VARIOUS EMBODIMENTS

Figure 1:
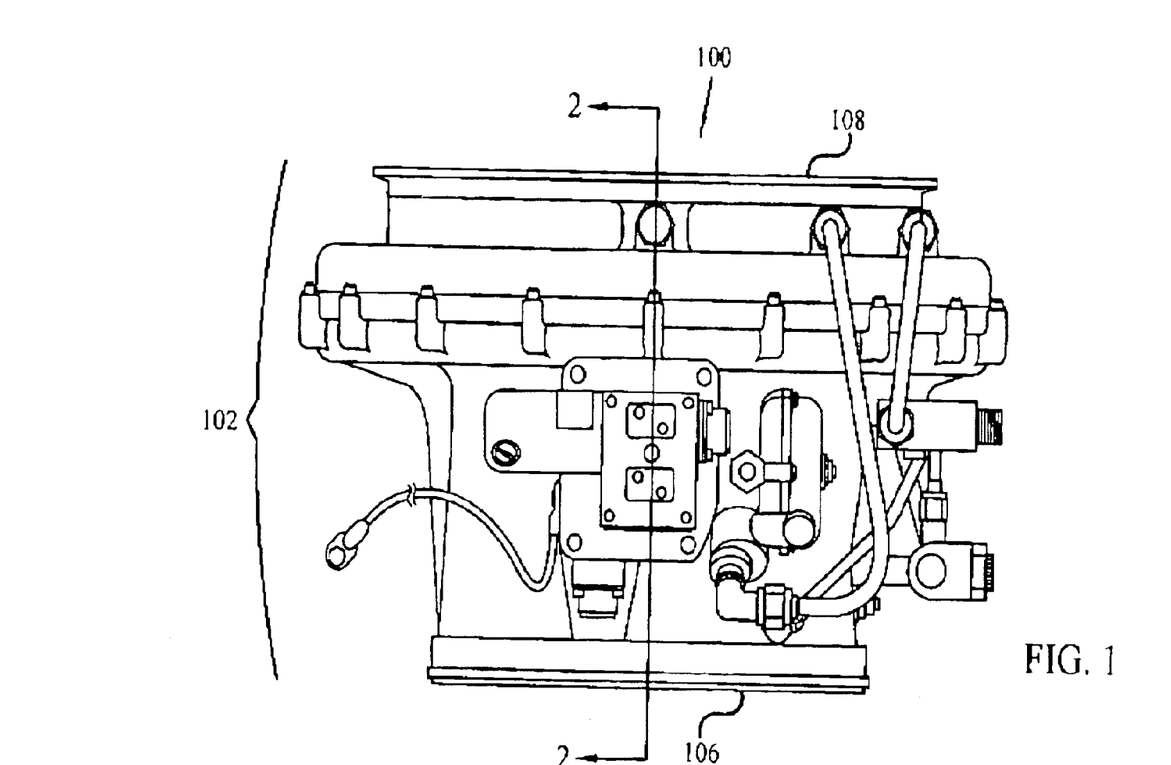
FIG. 1 is a front view of an air outflow valve according to an exemplary embodiment of the present invention.

A general description of an exemplary air outflow valve according to an embodiment of the present invention will first be described with reference to FIGS. 1 and 2, which depict a front view and a cross section view, respectively, of the air outflow valve 100. As can be seen, the outflow valve 100 includes a valve body 102 having a fluid flow path 104 that passes through the valve 100 from an inlet 108 to an outlet 106. One or more shafts 110 are rotationally mounted within the flow path 104, and a valve disk 112, preferably in the form of a butterfly plate, is mounted on the shaft 110. Thus, rotation of the shaft 110 causes movement of the valve disk 112.

The valve disk 112 is moveable through a plurality of positions between a fully closed position and a fully open position, as required to maintain a substantially constant cabin pressure in the aircraft into which it is installed. In the fully closed position, the valve disk 112 blocks substantially the entire fluid flow path 104. Conversely, in the fully open position, the valve disk 112 is positioned parallel with the flow of fluid through the flow path 104, providing very little resistance to fluid flow through the air outflow valve 100.

The valve body 102 includes at least two chambers, a first chamber 114 and a second chamber 116. A control diaphragm 118, mounted within the valve body 102, separates the first chamber 114 and second chamber 116 from one another. The first chamber 114 is fluidly coupled to receive a reference pressure and the second chamber 116 is fluidly coupled to receive a variable control vacuum. When the valve 100 is operating in the automatic mode (described more fully below), the magnitude of the variable control vacuum is modulated to control the movement of the control diaphragm 118. The movement of the control diaphragm 118, as will be described more fully below, controls movement of the valve disk 112.

Figure 2:
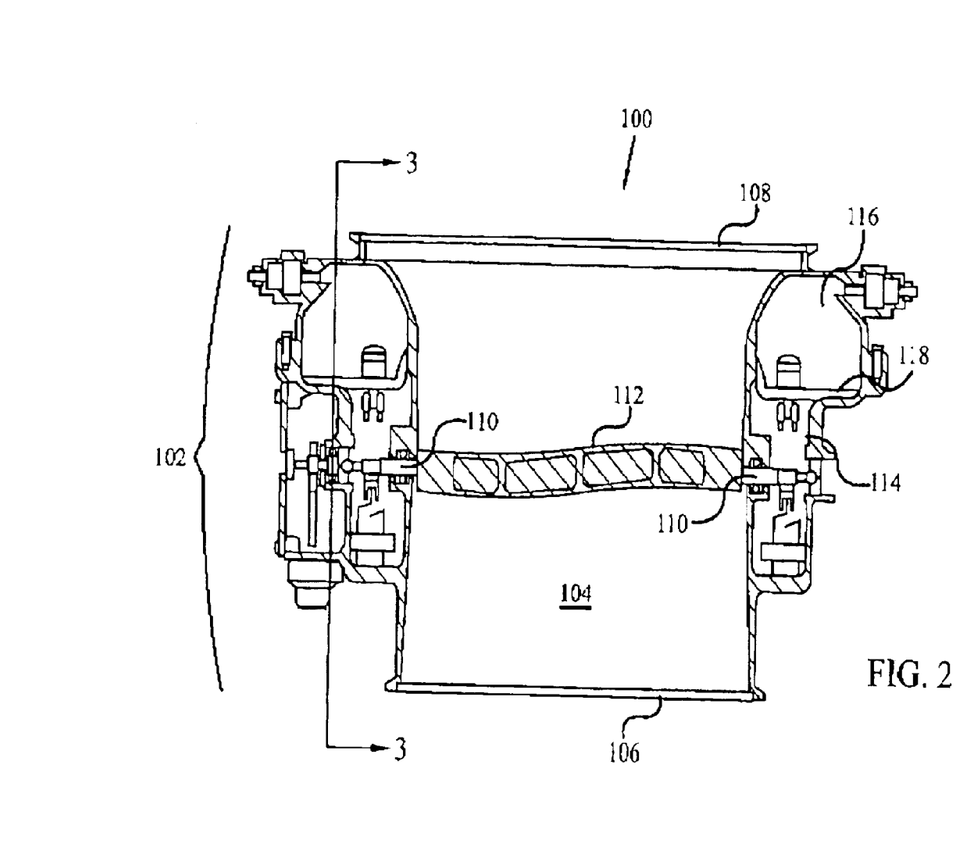
FIG. 2 is a cross sectional view of the air outflow valve taken along line 2—2 in FIG. 1.
Figure 3:
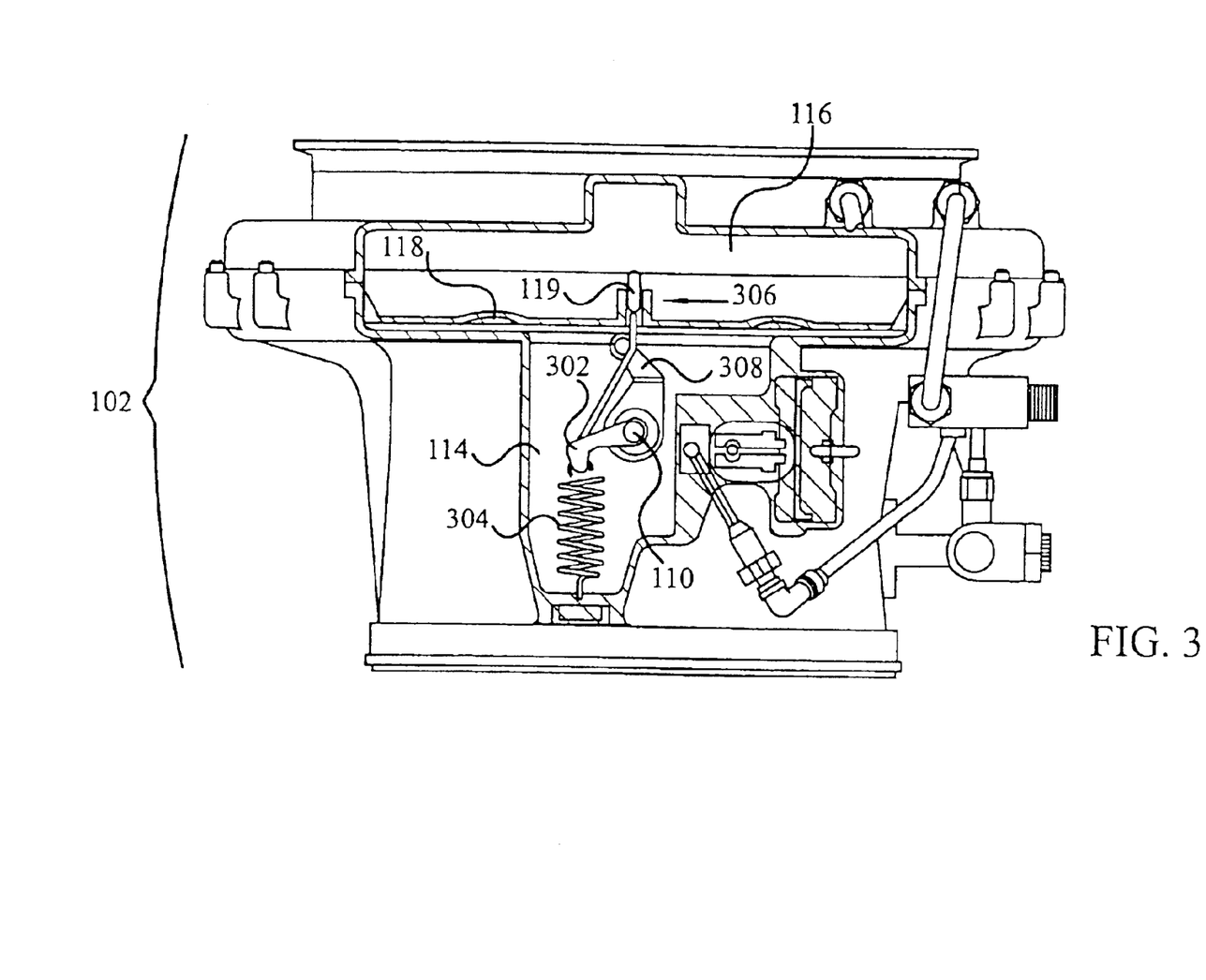
FIG. 3 is a partial cross sectional view of the outflow valve taken along line 3—3 in FIG. 2.

Turning now to FIG. 3, which depicts a partial cross section of the outflow valve 100 taken along line 3—3 in FIG. 2, it can be seen that a control arm 302 is positioned within the first chamber 114 and is coupled to the shaft 110. Thus, rotational movement of the control arm 302 causes rotational movement of the shaft 110 and rotational movement of the valve disk 112. A spring 304 is connected between the control arm 302 and the valve body 102 and biases the control arm 302, and thus the valve disk 112, toward the closed position. A cable assembly 306 is coupled between the control diaphragm 118 and the control arm 302. A pulley assembly 308 is also mounted within the valve body 102, and specifically in the first chamber 114. The control diaphragm 118, the cable assembly 306, and the pulley assembly 308 are positioned and configured such that when the valve disk 108 is closed, the cable assembly 306 is under tension. Thus, linear movement of the control diaphragm 118 is translated via the cable assembly 306 and pulley assembly 308, into rotational movement of the control arm 302, shaft 110, and valve disk 112. It is noted that although only a single control arm 302, spring 304, cable assembly 306, and pulley assembly 308 are depicted in FIG. 3, in a preferred embodiment two control arms 302, springs 304, cable assemblies 306, and pulley assemblies 308, one for each of the shafts 110 (or each end of a single shaft), are included in each air outflow valve 100.

As was previously noted, the air outflow valve 100 has various operational modes. These various operational modes include at least an automatic mode and a manual mode. In the automatic mode, the position of the valve disk 112 is controlled by movement of the control diaphragm 118. Specifically, as was noted above, the magnitude of the variable control vacuum, which is fluidly coupled to the second chamber 116, is sufficient to overcome the force of the spring 304 and is modulated to control the movement of the control diaphragm 108. In the automatic mode, the cable assemblies 306 remain under tension. Thus, as the control diaphragm 118 moves and overcomes the force of the spring 304, the control arm assembly 302 rotates, which causes rotation of the shaft 110 and valve disk 112 to the desired position. It is noted that a non-illustrated controller and servo mechanism are used to control the magnitude of the variable control pressure within the second chamber 116.

In the manual mode, a non-illustrated actuator is used to operate the shaft 110 to position the valve disk 112 to the desired position, while the control diaphragm 118 remains stationary. The particular actuator used to position the valve disk 112 is not necessary to understand the present invention and, therefore, will not be further described. Because the actuator rotates the shaft 110 and control arms 302 while the control diaphragm 118 remains stationary, the cable assemblies 306 are not maintained under tension. Instead, the cable assemblies 306 experience a compressive force. However, with the present invention, when the cable assemblies 306 experience this compressive force, they do not bend or kink, nor do they rub, in a potentially abrasive manner, against the pulley assembly 308. The reasons for this are discussed below.

Figure 4:
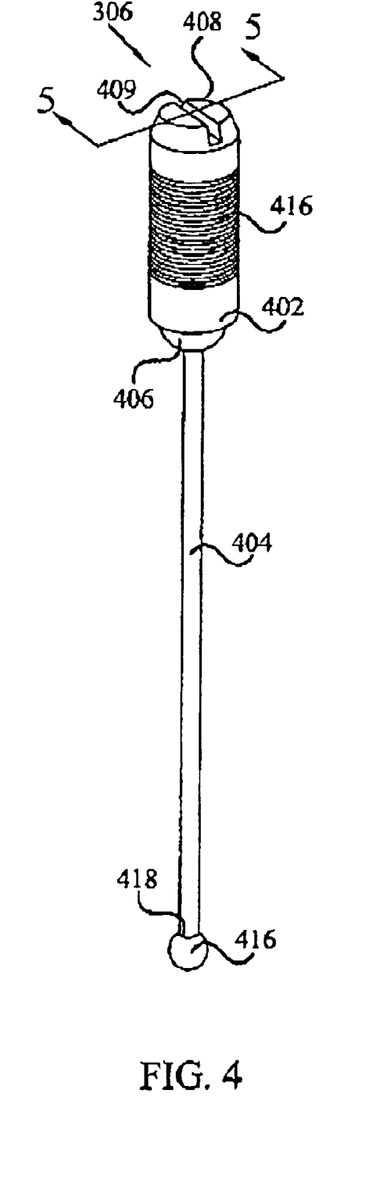
FIG. 4 is a perspective view of a cable assembly according to an embodiment of the present invention that may be used in the valve depicted in FIG. 1.
Figure 5:
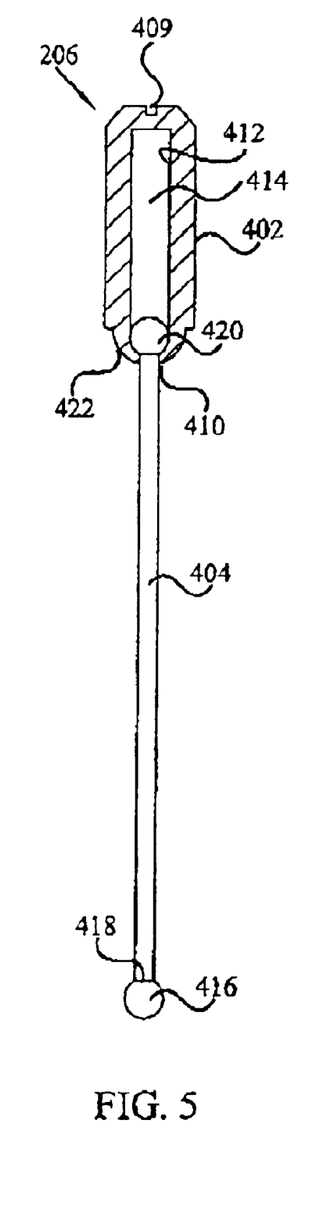
FIG. 5 is a cross sectional view of the cable assembly taken along line 5—5 in FIG. 4.

Perspective and cross section views of a cable assembly 306 are depicted, respectively, in FIGS. 4 and 5. As these views depict, the cable assembly 306 includes a retainer 402 and a cable 404. The retainer 402 has a first end 406 and a second end 408. An opening 410 is formed in the first end 406 of the retainer 402, and an internal surface 412 of the retainer 402 defines a cavity 414 that extends from the opening 410 into the retainer 402. The second end 408 of the retainer 402 includes one or more slots or indentations 409 for receiving an operating tool. The retainer 402 may also preferably include threads 416 on its outer surface 418. The threads 416 mate with like threads formed in a retaining nut 119 (see FIG. 1) mounted on the control diaphragm 118.

The cable 404 has a first retaining ball 416 coupled to a first end 418 and a second retaining ball 420 coupled to a second end 422. The first retaining ball 416 is retained in a retaining hole (described below) that is formed in the control arm 302. The second retaining ball 420 is slidably retained within the retainer cavity 414, since the opening 410 is dimensioned to prevent the second retaining ball 420 from falling out of the cavity 414 As a result, when the valve 100 is operated in the manual mode and the cable assembly 308 experiences the above-noted compressive force, the second end 422 of the cable 404 moves within the retainer cavity 410. It is noted that the distance that the cavity 414 extends into the retainer 402 may be any predetermined distance that is sufficient to ensure that significant bending or kinking of the cable 404 is inhibited or prevented during manual valve operation.

Figure 6:
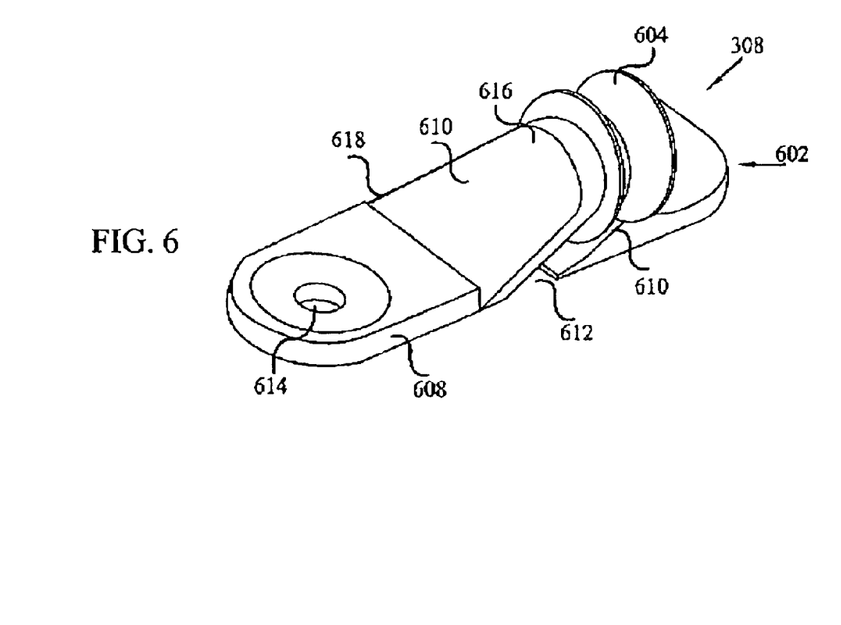
FIG. 6 is a perspective view of a pulley assembly according to an embodiment of the present invention that may be used in the valve depicted in FIG. 1.
Figure 7:
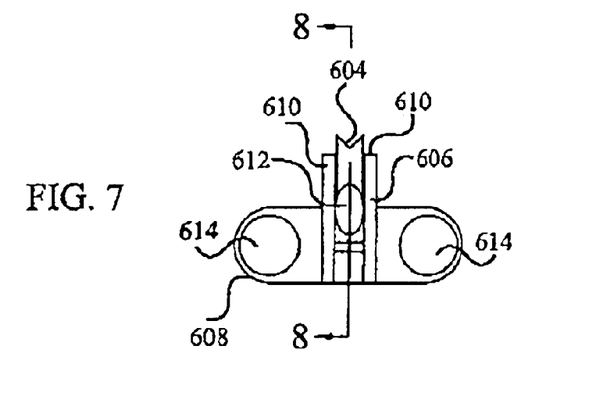
FIG. 7 is a top view of the pulley assembly depicted in FIG. 6.
Figure 8:
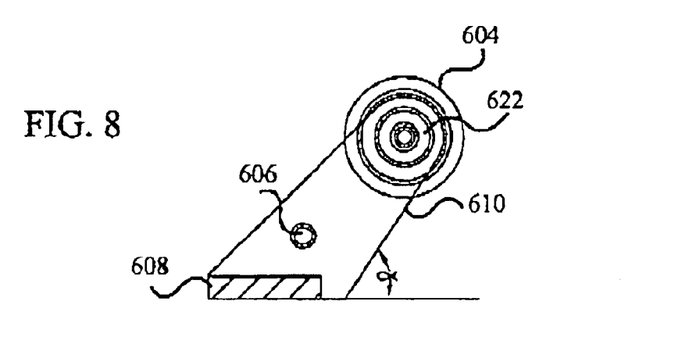
FIG. 8 is a cross sectional view of the pulley assembly taken along line 8—8 in FIG. 7.

The pulley assembly 308 also tends to inhibit or prevent damage to the cable 404. How this is accomplished can be seen by referring to FIGS. 6–8, which depict perspective, top, and cross section views, respectively, of the pulley assembly 308. Referring first to FIGS. 6 and 7, it can be seen that the pulley assembly 308 includes a pulley bracket 602, a pulley 604, and a roll pin 606 The pulley bracket 602 is constructed of a base 608 and at least two support arms 610. The base 608 has a cutout portion 612, and at least two fastener openings 614 for receiving fasteners that are used couple the pulley bracket 602 to the valve body 102. Each support arm 610 extends from the base 608 at a predetermined angle ($\alpha$), and includes a first opening 616 and a second opening 618. The first openings 616 in each support arm 610 support a sleeve bearing 622 on which the pulley 604 is rotationally mounted. The sleeve bearing contributes to a smoother riding pulley 604 and less wear on the cable 404, increasing cable life and reliability. The second openings 618 in each support arm 610 are used to rotationally mount the roll pin 606. With the roll pin 606, even if the cable 404 were to experience some slight bending or kinking, the cable 404 would not rub against the base 608 of the pulley bracket 602. This is because the cable 404 would slide against the roll pin 606. Moreover, because of the cutout portion 610, the cable 404 will also not rub against the base 608. Thus, abrasive rubbing of the cable 404 is substantially prevented or inhibited.

Figure 9:
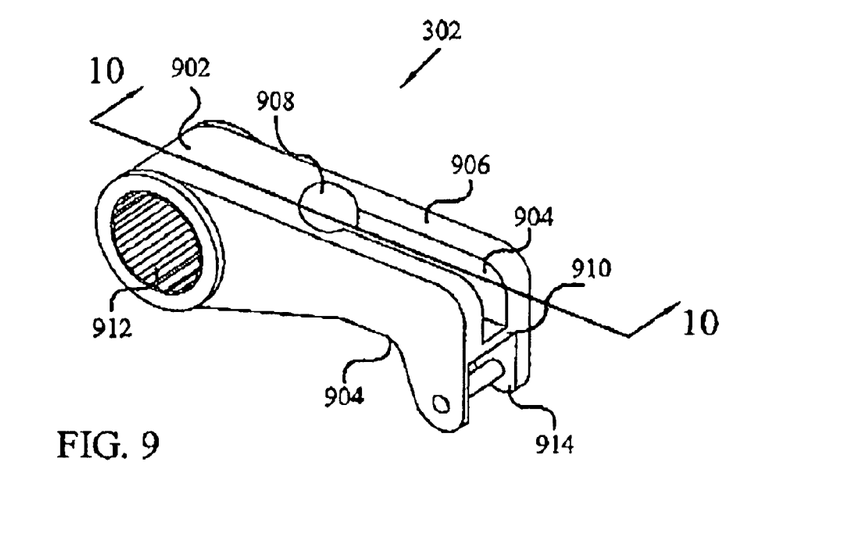
FIG. 9 is a perspective view of a control arm according to an embodiment of the present invention that may be used in the valve depicted in FIG. 1.
Figure 10:
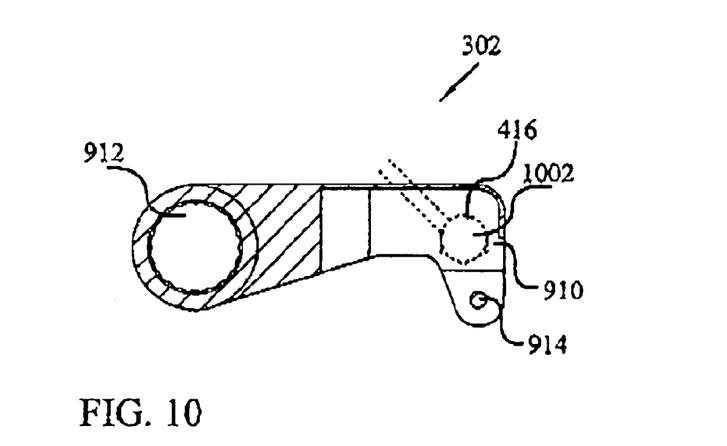
FIG. 10 is a cross sectional view of the control arm taken along line 10—10 in FIG. 9.

Turning now to FIGS. 9 and 10, a more detailed description of the control arm 302, which also tends to inhibit or prevent damage to the cable 404, will be provided. The control arm 302 includes a main body portion 902 having two arms 904 extending from it. The two arms 904 are separated from one another by a slot 906. The edges of the slot 906 are smoothed to remove any sharp edges. Additionally, the width of the slot is dimensioned to reduce the likelihood of the cable 404 rubbing against the slot 906 when the cable 404 experiences a compressive force. One end of the slot 906 includes an enlarged portion 908 through which the first retaining ball 416 passes so that it can be inserted into retaining holes 1002 formed in each of the arms 904, as shown more particularly in FIG. 10. It is noted that the retaining holes 1002 are dimensioned to allow some slight movement of the first retaining ball 416 (shown in phantom in FIG. 10) within the retaining holes 1002. Thus, the likelihood of stress failure of the joint between the cable 404 and the retaining ball is reduced.

A reinforcing support 910 is coupled between the two arms 904 near the free end of each arm 904. The reinforcing support 910 provides added strength to the arms 910, and helps prevent the cable 404 from becoming detached from the control arm 302. An opening 912 is formed through the main body portion 902 of the control arm 302, which receives an end of one of the one or more shafts 110. In the depicted embodiment, the opening 912 and the ends of the shaft 110 are serrated to mechanically couple the two components together. A roll pin 914 is rotationally mounted between the two arms 904 below the reinforcing support 908. The spring 304 is preferably coupled to the control arm 302 using the roll pin 914.

The control arms 302, cable assemblies 306, and pulley assemblies 308 are not only useful for installation into newly constructed air outflow valves 100, but may also be installed into existing air outflow valves 100 that do not have these improved components installed. To do so, a portion of the valve body is disassembled to expose the first 114 and second 116 chambers. The installed control arms, cable assemblies, and pulley assemblies are then removed, and are replaced with control arms 302, cable assemblies 306, and pulley assemblies 308 of the present invention. The valve body 102 is then reassembled.

Figure 11:
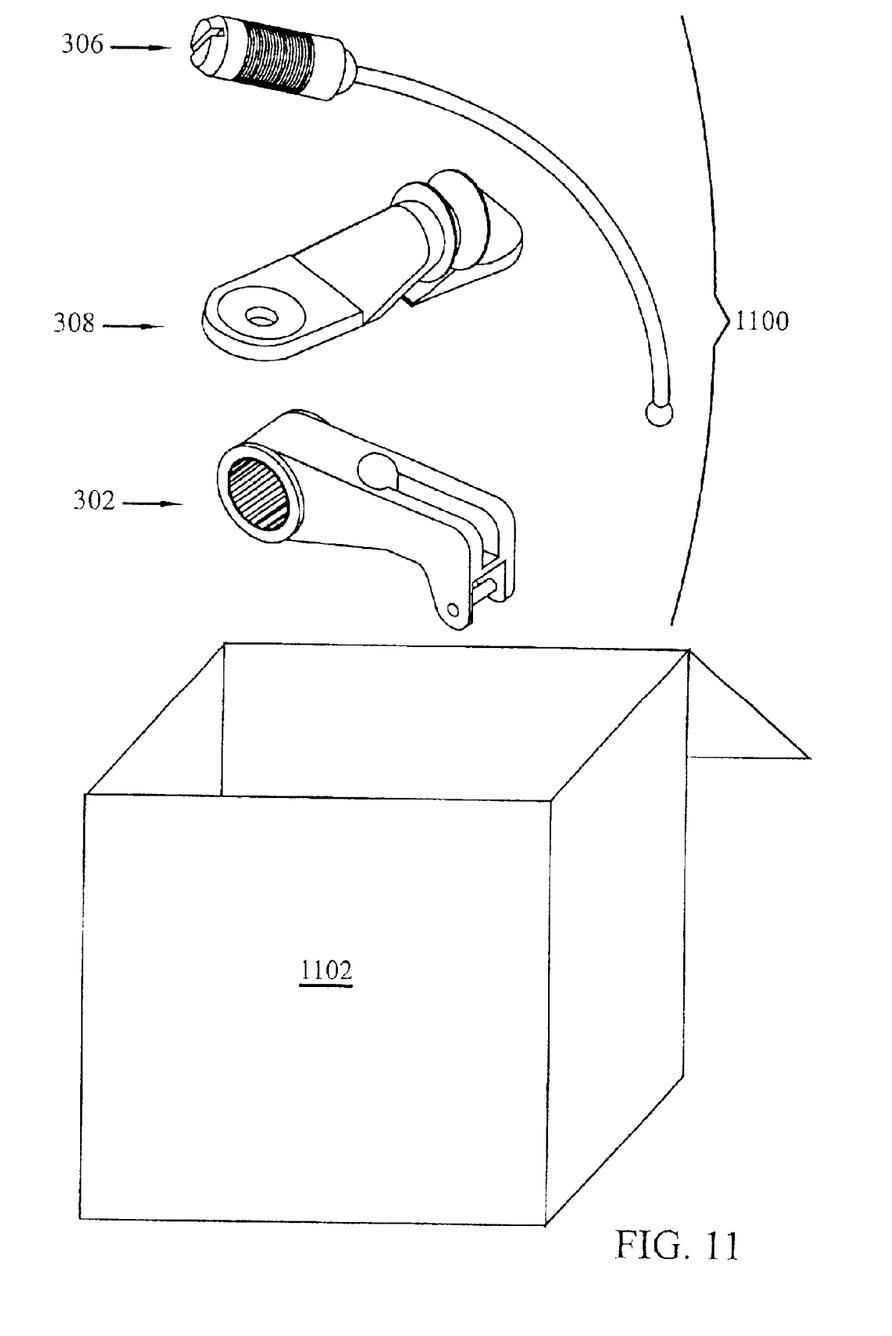
FIG. 11 depicts an exploded view of an exemplary embodiment of a kit and packaging for a kit that may be used to provide an improved air outflow valve.

In order to make the modifications described immediately above, the facility making the modification may use a kit 1100, such as the one depicted in FIG. 11. Preferably, the kit 1100 includes at least one control arm 302, at least one cable assembly 306, and at least one pulley assembly 308, and preferably two of each. The kit 1100 may also include other appropriate components and/or tools necessary to install the components in an air outflow valve 100. The kit 1100 may also include an appropriate container 1102 for shipping, storage, or other purposes.

The air outflow valve is more reliable than some existing air outflow valves, and has one or more components that independently could be used to modify existing air outflow valves to make them more reliable. The present design reduces the likelihood that any cable assembly will bend, kink, or rub when the valve is being operated manually, and reduces the likelihood for stress failure at the cable-retaining ball joint. The present design also provides components that will allow existing air outflow valves to be modified relatively quickly, inexpensively and in a relatively non-complex manner.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air outflow valve, comprising:

a valve body;

a valve disk movably mounted on the valve body and moveable through a plurality of positions between a closed position and an open position;

a control arm coupled to the valve disk;

a biasing element coupled between the control arm and the valve body for biasing the valve disk toward the closed position;

a control diaphragm mounted within the valve body;

a retainer coupled to the control diaphragm, the retainer having a body with an opening and an internal surface defining a cavity, the cavity extending from the opening a predetermined distance within the retainer; and a cable having a first end and a second end, the first end coupled to the control arm and the second end inserted through the opening and slidably located in the retainer cavity, the second end moveable within the retainer cavity between the opening and a position along the predetermined distance of the cavity, wherein the opening of the retainer is configured to retain the second end therein.

2. The valve of claim 1, further comprising:

a pulley assembly mounted within the valve body, the pulley assembly including a rotationally mounted pulley positioned to contact at least a portion of the cable when the cable is in tension.

3. The valve of claim 2, wherein the pulley assembly comprises:

a pulley bracket having a base coupled to the valve body;

at least two support arms extending from the base at a predetermined angle relative to the base, each support arm having a first end coupled to the base and a second end distal to the first end; and a roll pin mounted between the support arms proximate the first ends thereof, wherein the pulley is rotationally mounted between the support arms proximate the second ends thereof.

4. The valve of claim 3, wherein the pulley assembly further comprises a sleeve bearing on which the pulley is rotationally mounted.

5. The valve of claim 3, wherein the base of the pulley bracket includes at least one cutout on a portion thereof.

6. The valve of claim 1, wherein the valve disk comprises a butterfly plate.

7. The valve of claim 6, further comprising:

a shaft rotationally mounted within the valve body, wherein the valve plate is coupled to the shaft.

8. The valve of claim 1, wherein:

the valve body includes at least a first chamber and a second chamber; and the control diaphragm isolates the first chamber from the second chamber.

9. The valve of claim 8, further comprising:

a control vacuum pressure port coupled to the first chamber for receiving a control vacuum having a modulated magnitude, wherein the position of the control diaphragm is modulated based on the modulated control vacuum magnitude.

10. The valve of claim 1, wherein the cable has a retaining ball coupled to the first end, and wherein the control arm comprises:
   a main body portion;
   at least two arms extending from the main body portion substantially parallel with one another and spaced apart from one another to form a slot there between, each arm including an indentation collocated with the indentation in the other arm to form a retaining hole for receiving the retaining ball therein,
   wherein the retaining hole is dimensioned so as to allow the retaining ball to move within the retaining hole.

11. The valve of claim 10, wherein the control arm further comprises a roll pin coupled between each of the two arms, and wherein the biasing element is coupled to the roll pin.

12. The valve of claim 10, wherein edges of the slot are relatively smooth.

13. A kit for modifying an air outflow valve having a valve body, a valve disk movably mounted within the valve body and moveable through a plurality of positions between a closed position and an open position, and a control arm coupled to the valve disk, the kit comprising:
   a control arm, wherein the control arm comprises:
      a main body portion;
      at least two arms extending from the main body portion substantially parallel with one another and spaced apart from one another to from a slot there between, each arm including an indentation collocated with the indentation in the other arm to from a retaining hole for receiving the retaining ball therein;
   a cable assembly, wherein the cable assembly comprises:
      a retainer having a body with an opening in a first end thereof and an internal surface defining a cavity, the cavity extending from the opening a predetermined distance within the retainer; and
      a cable having a first end and a second end, the first end adapted for coupling to the control arm retaining hole and the second end inserted through the opening and slidably retained within the retainer cavity, the second end moveable within the retainer cavity between the opening and a position along the predetermined distance of the cavity,
      wherein the opening of the retainer is configured to retain the second end therein, and wherein the control arm retaining hole is dimensioned so as to allow the retaining ball to move within the control arm retaining hole; and
   a pulley assembly adapted for mounting within the value body, the pulley assembly including a rotationally mounted pulley positioned to be in physical contact with at least a portion of the cable when the cable is in tension.

14. The kit of claim 13, wherein the cable assembly further comprises:
   a first retaining ball coupled to the first end of the cable; and
   a second retaining ball coupled to the second end of the cable and operable to prevent the second end from being removed from the retainer opening.

15. The kit of claim 13, wherein the cable assembly further includes threads on at least a portion of an external surface of the retainer.

16. The kit of claim 13, wherein the pulley assembly comprises:
   a pulley bracket having base coupled to the valve body;
   at least two support arms extending from the base at a predetermined angle relative to the base, each support arm having a first end coupled to the base and a second end distal to the first end; and
   a roll pin mounted between the support arms proximate the first ends thereof,
   wherein the pulley is rotationally mounted between the support arms proximate the second ends thereof.

17. The kit of claim 16, wherein the pulley assembly further comprises a sleeve bearing on which the pulley is rotationally mounted.

18. The kit of claim 16, wherein the base of the pulley bracket includes at least one cutout on a portion thereof.

19. The kit of claim 13, further comprising:
   a biasing element,
   wherein the control arm further comprises a roll pin coupled between each of the two arms, and wherein the biasing element is adapted to be coupled to the roll pin.

20. The kit of claim 13, wherein edges of the slot are relatively smooth.

21. An air outflow valve, comprising:
   a valve body;
   a valve disk movably mounted on the valve body and moveable through a plurality of positions between a closed position and an open position;
   a control arm coupled to the valve disk, the control arm including:
      a main body portion, and
      at least two arms extending from the main body portion substantially parallel with one another and spaced apart from one another to from a slot there between, each arm including an indentation collocated with the indentation in the other arm to form a retaining hole;
   a biasing element coupled between the control arm and the valve body for biasing the valve disk toward the closed position;
   a control diaphragm mounted within the valve body;
   a retainer coupled to the control diaphragm, the retainer having a body with an opening and an internal surface defining a cavity, the cavity extending from the opening a predetermined distance within the retainer; and
   a cable having a first end and a second end, the first end having a retaining ball coupled thereto and the second end inserted through the opening in the retainer body and slidably located in the retainer cavity, the second end moveable within the retainer cavity between the opening and a position along the predetermined distance of the cavity,
   wherein the opening of the retainer body is configured to retain the second end therein, and wherein the retaining hole is dimensioned so as to allow the retaining ball to move within the retaining hole.

* * * * *